(12) United States Patent
Nadakuduti et al.

(10) Patent No.: US 12,574,865 B2
(45) Date of Patent: Mar. 10, 2026

(54) MULTI-RADIO TRANSMISSION ADJUSTMENT FOR TIME-AVERAGED RADIO FREQUENCY EXPOSURE

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/326,913

(22) Filed: May 31, 2023

(65) Prior Publication Data

US 2023/0397130 A1 Dec. 7, 2023

Related U.S. Application Data

(60) Provisional application No. 63/365,695, filed on Jun. 1, 2022.

(51) Int. Cl.
*H04W 52/36* (2009.01)
*H04B 1/3827* (2015.01)

(52) U.S. Cl.
CPC ........ *H04W 52/367* (2013.01); *H04B 1/3838* (2013.01)

(58) Field of Classification Search
CPC .......................... H04W 52/367; H04W 52/225; H04B 1/3838; H04B 2001/3844
See application file for complete search history.

(56) References Cited

U.S. PATENT DOCUMENTS

| | | | |
|---|---|---|---|
| 10,652,833 B2 | 5/2020 | Nadakuduti et al. | |
| 2014/0274190 A1 | 9/2014 | Lu et al. | |
| 2020/0389856 A1* | 12/2020 | Yao ......................... | H04B 17/26 |
| 2021/0099194 A1* | 4/2021 | Jadhav ................. | H04B 1/3838 |
| 2021/0321340 A1* | 10/2021 | Krenz ............... | H04W 72/0473 |
| 2022/0159581 A1 | 5/2022 | Lu et al. | |

FOREIGN PATENT DOCUMENTS

EP 3567940 A1 11/2019

OTHER PUBLICATIONS

International Search Report and Written Opinion—PCT/US2023/067759—ISA/EPO—Sep. 13, 2023.

* cited by examiner

*Primary Examiner* — John J Lee
(74) *Attorney, Agent, or Firm* — Patterson & Sheridan, L.L.P/Qualcomm Incorporated

(57) ABSTRACT

Certain aspects of the present disclosure provide techniques and apparatus for multi-radio transmission scaling. A method that may be performed by a wireless device includes obtaining scaling information indicative of a relationship between a first radio frequency (RF) exposure associated with a plurality of first radios and a second RF exposure associated with a single second radio, and transmitting signals using a plurality of radios at one or more transmit powers determined based at least in part on a time-averaged RF exposure limit and the scaling information.

25 Claims, 11 Drawing Sheets

| Band/Mode | Head Exposure (W/kg) | Body Exposure (W/kg) | Hotspot Exposure (W/kg) |
|---|---|---|---|
| LTE Band A | 0.35 | 0.34 | 0.62 |
| LTE Band B | 0.33 | 1.15 | 1.18 |
| LTE Band C | 0.30 | 1.01 | 1.25 |
| NR Band A | 0.96 | 0.72 | 1.08 |
| NR Band B | 0.12 | 0.40 | 0.89 |
| NR Band C | 1.03 | 0.19 | 0.39 |
| 2.4 GHz WLAN | 0.10 | 0.17 | 0.43 |
| Bluetooth | 0.22 | 0.10 | 0.10 |
| Simultaneous TX | 1.55 | 1.57 | 1.59 |

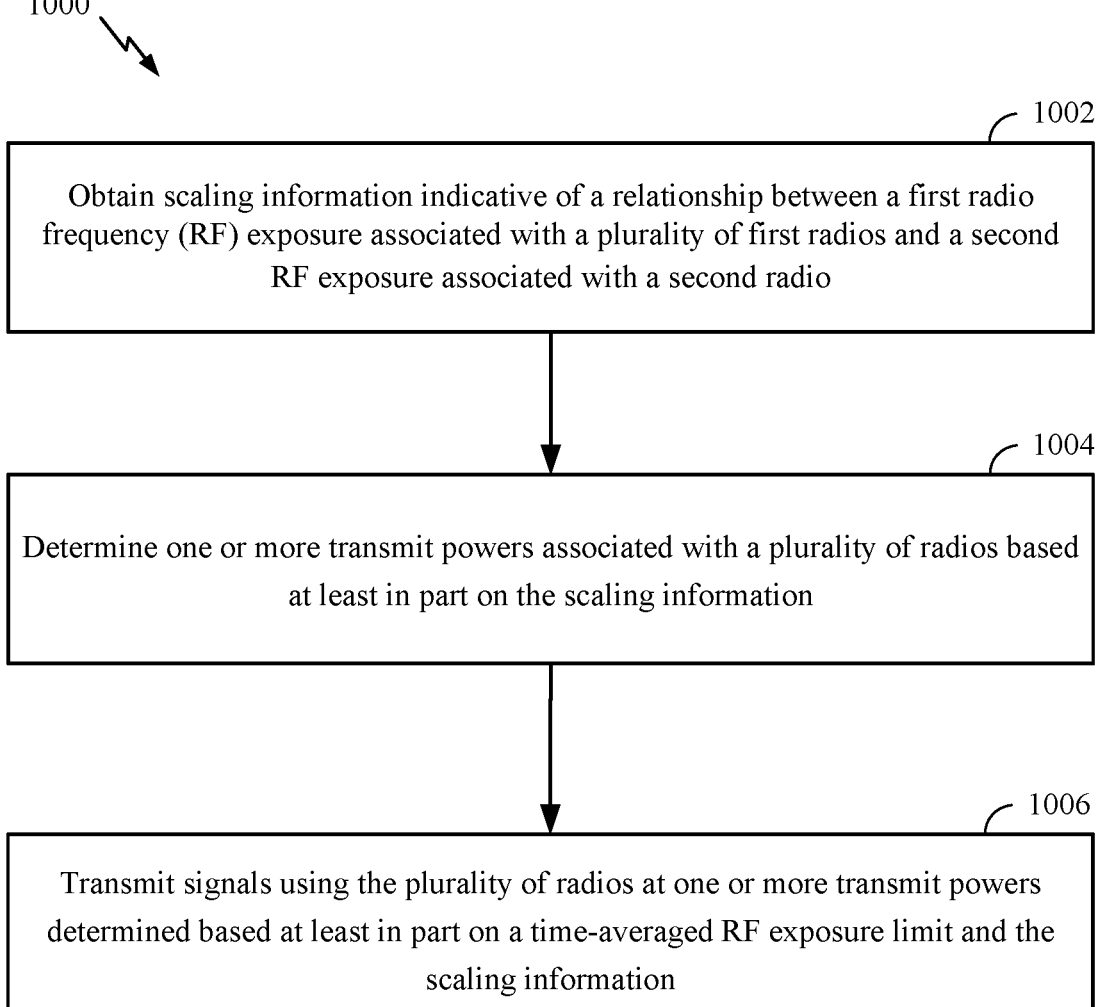

1002

Obtain scaling information indicative of a relationship between a first radio frequency (RF) exposure associated with a plurality of first radios and a second RF exposure associated with a second radio

1004

Determine one or more transmit powers associated with a plurality of radios based at least in part on the scaling information

1006

Transmit signals using the plurality of radios at one or more transmit powers determined based at least in part on a time-averaged RF exposure limit and the scaling information

FIG. 10

MULTI-RADIO TRANSMISSION ADJUSTMENT FOR TIME-AVERAGED RADIO FREQUENCY EXPOSURE

CROSS-REFERENCE TO RELATED APPLICATION(S)

The present Application for Patent claims benefit of U.S. Provisional Application No. 63/365,695, filed Jun. 1, 2022, which is hereby expressly incorporated by reference herein in its entirety.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance.

Certain aspects of the subject matter described in this disclosure can be implemented in a method for wireless communication by a wireless device. The method generally includes obtaining scaling information indicative of a relationship between a first radio frequency (RF) exposure associated with a plurality of first radios and a second RF exposure associated with a single second radio, and transmitting signals using a plurality of radios at one or more transmit powers determined based at least in part on a time-averaged RF exposure limit and the scaling information.

Certain aspects of the subject matter described in this disclosure can be implemented in an apparatus for wireless communication. The apparatus generally includes a memory and one or more processors coupled to the memory. The one or more processors are configured to obtain scaling information indicative of a relationship between a first radio frequency (RF) exposure associated with a plurality of first radios and a second RF exposure associated with a single second radio, and transmit signals using a plurality of radios at one or more transmit powers determined based at least in part on a time-averaged RF exposure limit and the scaling information.

Certain aspects of the subject matter described in this disclosure can be implemented in an apparatus for wireless communication. The apparatus generally includes means for obtaining scaling information indicative of a relationship between a first radio frequency (RF) exposure associated with a plurality of first radios and a second RF exposure associated with a single second radio; and means for transmitting signals using a plurality of radios at one or more transmit powers determined based at least in part on a time-averaged RF exposure limit and the scaling information.

Certain aspects of the subject matter described in this disclosure can be implemented in a computer-readable medium. The computer-readable medium has instructions stored thereon, that when executed by an apparatus, cause the apparatus to perform operations including: obtaining scaling information indicative of a relationship between a first radio frequency (RF) exposure associated with a plurality of first radios and a second RF exposure associated with a single second radio; and transmitting signals using a plurality of radios at one or more transmit powers determined based at least in part on a time-averaged RF exposure limit and the scaling information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a table illustrating example maximum RF exposure levels measured for a particular wireless device.

FIG. 10 is a flow diagram illustrating example operations for wireless communication by a wireless device, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
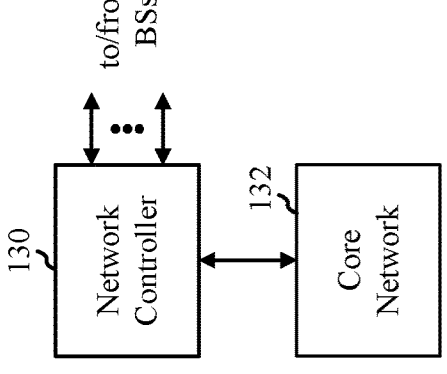
FIG. 1 is a block diagram conceptually illustrating an example wireless communication network, in accordance with certain aspects of the present disclosure.

Aspects of the present disclosure provide apparatus, methods, processing systems, and computer-readable mediums for adjusting a transmit power in multi-radio transmission scenarios for radio frequency (RF) exposure compliance.

In certain cases, a wireless device may evaluate the RF exposure over a given time window in real time to ensure the maximum time-averaged transmit power level (e.g., $P_{limit}$) is not exceeded by determining a maximum allowed transmit power (e.g., $P_{max}$) for a given time interval based on past transmission history. In certain aspects, the wireless device may transmit according to a RF exposure design target level corresponding to $P_{limit}$ in single radio transmission scenarios (for example, where only a single radio is transmitting). For compliance purposes, the RF exposure design target level may be at least lower than the RF exposure regulatory limit after subtracting an uncertainty (e.g., k=2) associated with the wireless device (95% confidence), such that the wireless device may be guaranteed to be compliant when operating even under particular uncertainty levels (e.g., k=2). This approach is typically followed for a mass-produced wireless device so that compliance is guaranteed with 95% confidence. The RF exposure design target level for certain radios (e.g., sub-6 GHz radios) may be selected to be much lower than this level (e.g., RF exposure regulatory limit after subtracting device uncertainty). In some cases, the wireless device may ensure compliance with an RF exposure regulatory limit using a look-up table of maximum time-averaged transmit power levels (e.g., $P_{limit}$), where the wireless device may only allow transmit powers less than or equal to $P_{limit}$ without considering the actual time-averaged exposure. The look-up table-based solution and time-averaging solution may perform similarly in terms of maximizing transmit power for single radio transmission scenarios (for example, where only a single radio is transmitting). In multi-radio transmission scenarios (for example, where multiple radios are transmitting at the same time or in the same time interval), the look-up-table-based solution may operate such that the maximum total exposure from the active radios is close to the RF exposure regulatory limit (e.g., maximum total exposure is more than the RF exposure design target level plus the wireless device uncertainty). In the same multi-radio transmission scenarios, the time-averaging solution may operate such that the maximum total time-averaged exposure from the active radios is below or equal to the RF exposure design target level plus device uncertainty. In other words, the look-up-table-based solution may enable the wireless device to transmit at higher total power levels compared to the time-averaging solution in multi-radio transmission scenarios.

Aspects of the present disclosure provide apparatus and methods for adjusting a transmit power in a time-averaged RF exposure operation for multi-radio transmission scenarios. In some cases, a wireless device may adjust a maximum time-averaged power level (e.g., $P_{limit}$) of each active radio based on certain scaling information, as further described herein. For example, the scaling information may represent the amount to increase a transmit power in a multi-radio transmission scenario relative to a single radio transmission scenario, as further described herein. In certain cases, the wireless device may adjust past transmit power history and/or maximum allowed transmit power based on the scaling information, as further described herein. In multi-radio transmission scenarios, the scaling information may enable the wireless device to operate at a time-averaged RF exposure level that is close to a RF exposure limit, which may be set according to a regulatory agency or standards organization, for example.

The apparatus and methods for transmit power adjustment described herein may facilitate improved wireless communication performance (e.g., lower latencies and/or higher throughput). For example, the transmit power adjustment may allow a wireless device to transmit at transmit powers close to the time-averaged RF exposure limit in multi-radio transmission scenarios.

As used herein, a "radio" may refer to a physical or logical transmission path associated with one or more active frequency bands (carriers, channels, bandwidths, subdivisions thereof, etc.), transceivers, and/or radio access technologies (RATs) (e.g., code division multiple access (CDMA), Long Term Evolution (LTE), New Radio (NR), IEEE 802.11, Bluetooth, etc.) used for wireless communications. For example, for uplink carrier aggregation in LTE and/or NR, each of the active component carriers used for wireless communications may be treated as a separate radio. Similarly, multi-band transmissions for IEEE 802.11 communications may be treated as separate radios for each frequency band (e.g., 2.4 GHz, 5 GHz, or 6 GHz). As used herein, a "multi-radio transmission scenario" can also be referred to as a simultaneous transmission scenario where multiple radios (e.g., NR and IEEE 802.11 radios) are transmitting simultaneously for a particular duration or transmitting within a same time interval, such as a time interval associated with a time-averaging time window for a time-averaged RF exposure limit.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QoS) specifications. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance using scaled transmit powers, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
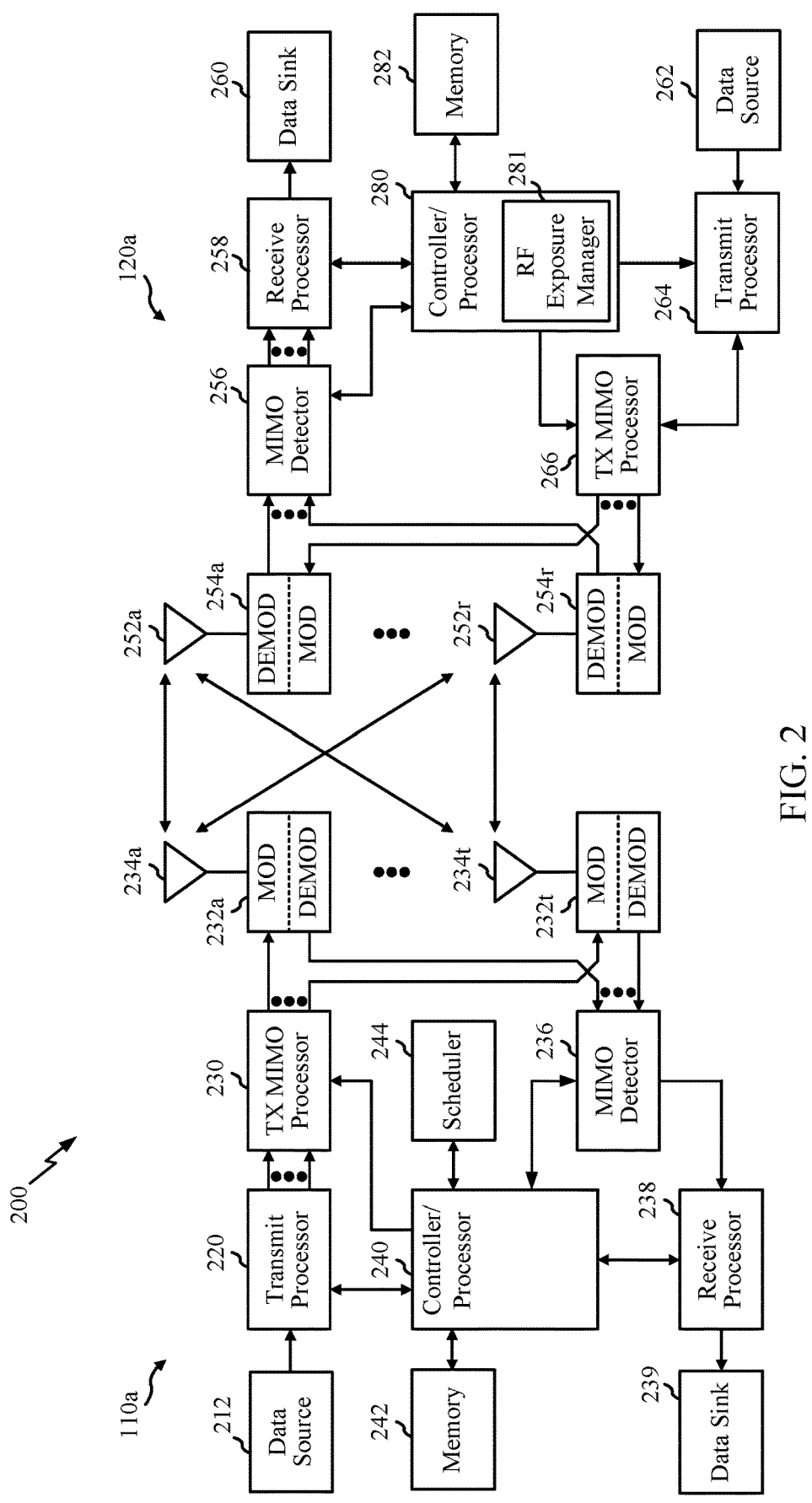
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
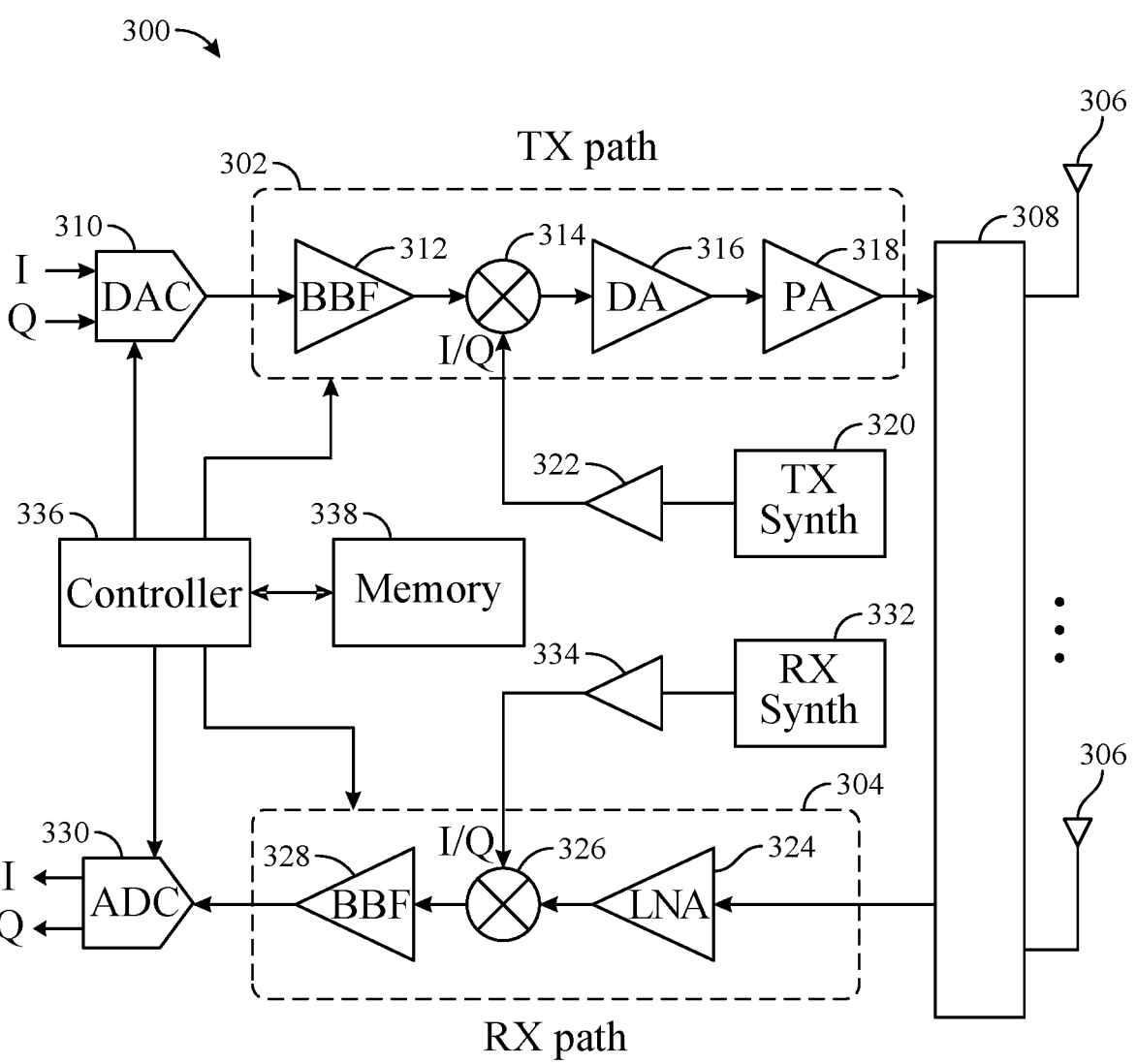
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain applied at BBF 312, DA 316, and/or the PA 318) that complies with an RF exposure limit, for example, set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter (mW/cm$^2$). In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

Figures 4A, 4B, 4C:
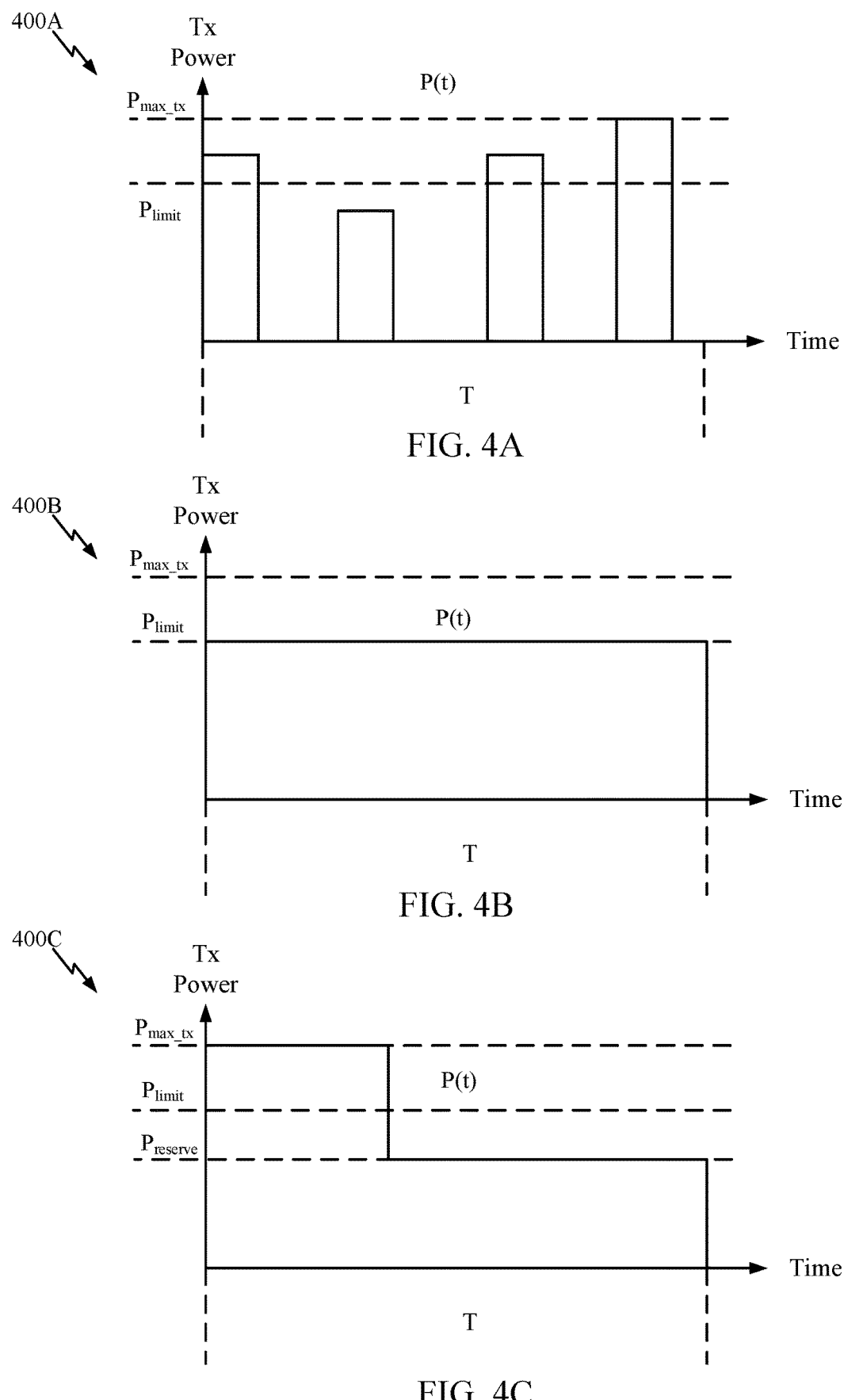
FIGS. 4A, 4B, and 4C are graphs illustrating examples of transmit powers over time in compliance with a time-averaged RF exposure limit, in accordance with certain aspects of the present disclosure.

In certain cases, compliance with an RF exposure limit may be performed as a time-averaged RF exposure evaluation within a specified time window (T) (e.g., 2 seconds for 60 GHz bands, 100 or 360 seconds for bands≤6 GHz, etc.) associated with the RF exposure limit. FIG. 4A is a graph 400A of a transmit power over time (P(t)) that varies over a running (also referred to as rolling or moving) time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max\_tx}$, which may be the maximum transmit power supported by the UE, the maximum instantaneous transmit power the wireless device is capable of outputting, and/or the maximum instantaneous transmit power allowed by a standard or regulatory body (e.g., the maximum output power, $P_{CMAX}$). In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as a maximum time-averaged power level or limit, or in terms of exposure, the maximum time-averaged RF exposure level or limit. The graph 400A also illustrates gaps between transmission bursts, where the gaps represent periods during which no transmission was output from the device.

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

FIG. 4C is a graph 400C of a transmit power over time (P(t)) illustrating a time-averaged mode that provides a reserve power to enable a continuous transmission within the time window (T), in accordance with certain aspects of the present disclosure. As shown, the transmit power may be backed off from the maximum instantaneous power ($P_{max\_tx}$) to a reserve power ($P_{reserve}$) so that the UE can continue transmitting at the lower power ($P_{reserve}$) to maintain a continuous transmission during the time window (e.g., maintain a radio connection with a receiving entity). In FIG. 4C, the area between $P_{max\_tx}$ and $P_{reserve}$ for the time duration of $P_{max\_tx}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max\_tx}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications) or at such fixed power plus a margin. The transmit duration at $P_{max\_tx}$ may be referred to as the burst transmit time (or high power duration). When more margin is available in the future (after T seconds), the transmitter may be allowed to transmit at a higher power again (e.g., in short bursts at $P_{max\_tx}$).

In some aspects, the UE may transmit at a power that is higher than the average power level, but less than $P_{max\_tx}$ in the time-averaged mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts may be separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during one or more other parts of the duty cycle. The duty cycle of the transmission may be indicative of a portion (e.g., 5 ms) of a specific period (e.g., 500 ms) in which one or more signals are transmitted. The duty cycle may be a ratio of the time length of the portion to the specific period (e.g., 100 ms/500 ms), where the duty cycle may be represented as a number from zero to one. In certain cases, the duty cycle may be standardized (e.g., predetermined) with a specific RAT and/or vary over time, for example, due to changes in radio conditions, mobility, and/or user behavior. Duty cycle can be applied to any of the power levels described herein. For example, when the transmission is limited to a reserve level (e.g., $P_{reserve}$), that specific radio may transmit at a higher peak transmit power level depending on the duty cycle where the average level corresponds to the reserve level.

For purposes of certifying a wireless device for RF exposure compliance, a wireless device may undergo certain RF exposure testing where maximum RF exposure levels (e.g., SAR and/or PD) are measured in various scenarios including various frequency bands, RF exposure scenarios, and RATs (e.g., 4G, 5G NR, IEEE 802.11, and/or Bluetooth). Here, maximum RF exposure levels in single radio transmission scenario may be measured with the wireless device transmitting at a worst-case power levels of $P_{limit}$ plus the wireless device uncertainty. For example, the maximum RF exposure levels of the wireless device may be measured across certain LTE and/or 5G NR frequency bands in various RF exposure scenarios including head exposure, body exposure, and/or hotspot exposure.

FIG. 5 is a table illustrating example maximum RF exposure levels measured for a particular wireless device. In this example, the wireless device may exhibit a peak RF exposure in certain LTE bands and an NR band for the respective exposure scenarios. The wireless device may also exhibit an RF exposure level that satisfies the RF exposure regulatory limit (e.g., 1.6 W/kg) when transmitting simultaneously via multiple radios.

Multi-mode/multi-band wireless devices have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless device may limit maximum transmit power for both sub-6 GHz bands and bands greater than 6 GHz.

In certain cases, the wireless device may evaluate the RF exposure over a given time window in real time to ensure the maximum time-averaged transmit power (e.g., $P_{limit}$) is not exceeded by determining a maximum allowed transmit power (e.g., $P_{max}$) for a given time interval based on the past transmission history. In certain aspects, the wireless device may transmit according to a RF exposure design target level corresponding to $P_{limit}$ in single radio transmission scenarios. In some cases, the wireless device may ensure compliance with an RF exposure regulatory limit using a look-up table of maximum time-averaged transmit power levels (e.g., $P_{limit}$), where the wireless device may only allow transmit powers less than or equal to $P_{limit}$ (or the specified RF exposure design target level) without considering the actual time-averaged exposure. The look-up-table-based solution and time-averaging solution may perform similarly in terms of maximizing transmit power for single radio transmission scenarios (e.g., where only a single radio is transmitting). Note that here, due to device uncertainty, mass produced wireless devices have transmit power levels in the range of $P_{limit}$ plus or minus (+/−) the device uncertainty. RF exposure levels in single radio transmission scenarios of mass-produced wireless devices are in the range of RF exposure design target plus or minus (+/−) the device uncertainty. FIG. 5 depicts the maximum measured RF exposure level close to RF exposure design target plus a device measurement uncertainty.

The exposure values depicted in FIG. 5 are worst-case SAR values obtained when the wireless device is transmitting at $P_{limit}$ plus a device uncertainty. On a production line, the wireless devices can be operating at its maximum time-averaged power anywhere between $P_{limit}$ minus the uncertainty to $P_{limit}$ plus the uncertainty. Manufacturers report worst-case exposure values, e.g., for a device operating at $P_{limit}$ plus uncertainty. For example, suppose the RF exposure regulatory limit is equal to 1.6 W/kg, and the device uncertainty is equal to 1 decibel (dB), which is about 25%. To comply with the RF exposure limit, the RF design target level can be at most 75% of the RF exposure limit (e.g., 1.6*(100%−25%)=1.2 W/kg). In single radio cases, the wireless device may operate at a RF design target level of 1.0 W/kg, such that the worst-device produced will have a SAR equal to 1.25 W/kg (e.g., 1.0 W/kg*125%). In multi-radio cases, the wireless device may ensure the total RF exposure from the active radios is less than or equal to a RF exposure design target (e.g., 1.0 W/kg), where the uncertainty may range between +/−25% of this level providing a worst-case exposure of 1.25 W/kg, for example. In a look-up table approach, the wireless device may operate at the worst-case exposure of 1.2 W/kg in single radio cases. In a two-radio example, instead of reducing each radio to 50%, the look-up tables may reduce each radio to something higher than 50% as long as a worst-case total exposure does not exceed 1.6 W/kg regulatory limit after accounting for 1 dB (25%) device uncertainty.

In multi-radio transmission scenarios (e.g., where multiple radios are transmitting at the same time or in the same time interval associated with a time-averaging time window of an RF exposure limit), the look-up-table-based solution may operate such that the maximum total exposure from the active radios is close to the RF exposure regulatory limit. In the same multi-radio transmission scenarios, the time-averaging solution may operate such that the maximum total time-averaged exposure from the active radios is below or equal to the specified RF exposure design target plus device uncertainty, which may be much lower than the RF exposure regulatory limit, for example, due to the wireless device relying on single radio RF exposure levels as depicted in FIG. 5. In other words, the look-up-table-based solution may enable the wireless device to transmit at higher total power levels compared to the time-averaging solution in multi-radio transmission scenarios. For example, the time-averaging solution may result in operating the maximum total time-averaged exposure at the single radio exposure levels (e.g., 1.03, 1.15, or 1.25 W/kg) depicted in FIG. 5, whereas the look-up-table-based solution may result in operating the maximum total exposure at the multi-radio exposure levels (e.g., 1.55, 1.57, or 1.59 W/kg).

Example Multi-Radio Transmission Adjustment for Time-Averaged RF Exposure

Aspects of the present disclosure provide apparatus and methods for adjusting a transmit power in a time-averaged RF exposure operation for multi-radio transmission scenarios. In some cases, a wireless device may adjust a maximum time-averaged power level (e.g., $P_{limit}$) based on certain scaling information, as further described herein. For example, the scaling information may represent the amount to increase a transmit power in a multi-radio transmission scenario relative to a single radio transmission scenario, as further described herein. In certain cases, the wireless device may adjust past transmit power history and/or maximum allowed transmit power based on the scaling information, as further described herein. In multi-radio transmission scenarios, the scaling information may enable the wireless device to operate at a time-averaged RF exposure level that is close to the RF exposure regulatory limit.

The apparatus and methods for transmit power adjustment described herein may facilitate improved wireless communication performance (e.g., lower latencies, higher throughput, and/or a greater transmission range). For example, the transmit power adjustment may allow a wireless device to transmit at transmit powers close to or at the time-averaged RF exposure regulatory limit in multi-radio transmission scenarios.

In certain aspects, the wireless device may scale transmit powers in a time-averaged RF exposure operation for multi-radio transmission scenarios using scaling information. The scaling information may be indicative of a relationship between a multi-radio exposure level and a single radio exposure level, such as the exposure levels depicted in FIG. 5. The scaling information may include a scaling factor as a ratio of a multi-radio exposure level to a single radio exposure level. The scaling factor may allow the wireless device to allocate an increased level of transmit power to multi-radio transmission scenarios while satisfying the RF exposure regulatory limit. The scaling factor may be determined according to the following expression:

$$\text{scaling\_factor} = \frac{\text{exposure}_{multi}}{\text{exposure}_{single}} \qquad (1)$$

where $\text{exposure}_{multi}$ is the maximum RF exposure level exhibited (or estimated) for a multi-radio transmission scenario, and $\text{exposure}_{single}$ is the maximum RF exposure level exhibited (or estimated) for a single radio transmission scenario. The $\text{exposure}_{single}$ may correspond to a measured (or estimated or pre-determined) RF exposure level plus a level of uncertainty (e.g., +25%). The uncertainty may account for uncertainties in transmit automatic gain control error (e.g., error or uncertainty with the transmit power reported for a particular time interval associated with a time-averaged RF exposure limit) and/or device-to-device variations related to manufacturing the wireless device in mass-produced quantities. For example, a representative wireless device may exhibit a RF exposure around a particular RF exposure design target, and 95% of the same mass-produced wireless devices may be in the range of the RF exposure design target plus or minus (+/−) the device uncertainty, and a worst-case wireless device may be around the RF exposure design target plus the device uncertainty. The exposure levels in the scaling factor may correspond to the same RF exposure scenario, for example, head exposure, body exposure, and/or hotspot exposure. The exposure levels in the scaling factor may be the same type of exposure metric, for example, SAR or PD. For example, the scaling information may be applied to time-averaged RF exposure compliance in sub-6 GHz bands and/or mmWave bands. It will be appreciated that the wireless device may apply the scaling information described herein for various time-averaged RF exposure design targets, such as a time-averaged SAR design target or a time-averaged PD design target. In certain cases, the scaling factor may be determined as a lowest (smallest) value among ratios of the multi-radio exposure level to the single radio exposure levels for the respective exposure scenarios (for example, scaling_factor=min{1.55/1.03, 1.57/1.15, 1.59/1.25}=1.27 from the exposure levels and respective exposure scenarios depicted in FIG. 5).

In some cases, the wireless device may be configured with various scaling factors corresponding to different transmit scenarios, where a transmit scenario may depend on the RAT, frequency band, antenna, antenna group, radio, RF exposure scenario, or any combination thereof. For example, the wireless device may have a first scaling factor corresponding to head exposure and a second scaling factor corresponding to hotspot exposure. As an example, the wireless device may have a first scaling corresponding to a first set of NR bands and a second scaling factor corresponding to a second set of NR bands. It will be appreciated that other conditions and/or criteria may be used to define the transmit scenarios for the various configured scaling factors in addition to or instead of those described herein.

A scaling factor among multiple scaling factors can be applied depending on multi-radio transmission scenario. For example, multiple scaling factors can be stored on the device for each single radio supported by the wireless device. A specific scaling factor can be determined for a given multi-radio transmission scenario as a factor associated with at least one of the radios of a respective scenario (e.g., for a given set of active single transmit radios and RF exposure scenario). For example, a scaling factor may be determined as the lowest (smallest) factors among the factors associated with the radios of the current multi-radio transmission (e.g., $\min\{\text{scaling\_factor}(i=1 \text{ to N radios that are part of current})\}$ multi-radio transmission) for the current RF exposure scenario}). The wireless device may apply the determined scaling factor for the particular multi-radio transmission scenario as further described herein.

In certain aspects, the scaling factor(s) may be applied to $P_{limit}$ in multi-radio transmission scenarios. To get a total time-averaged RF exposure close to the regulatory limit, the wireless device may adjust $P_{limit}$ using the scaling factor(s). For example, the wireless device may increase $P_{limit}$ using the scaling factor(s). In single radio transmission scenarios, the wireless device may refrain from using the scaling factor or apply a scaling factor equal to one.

Figure 6:
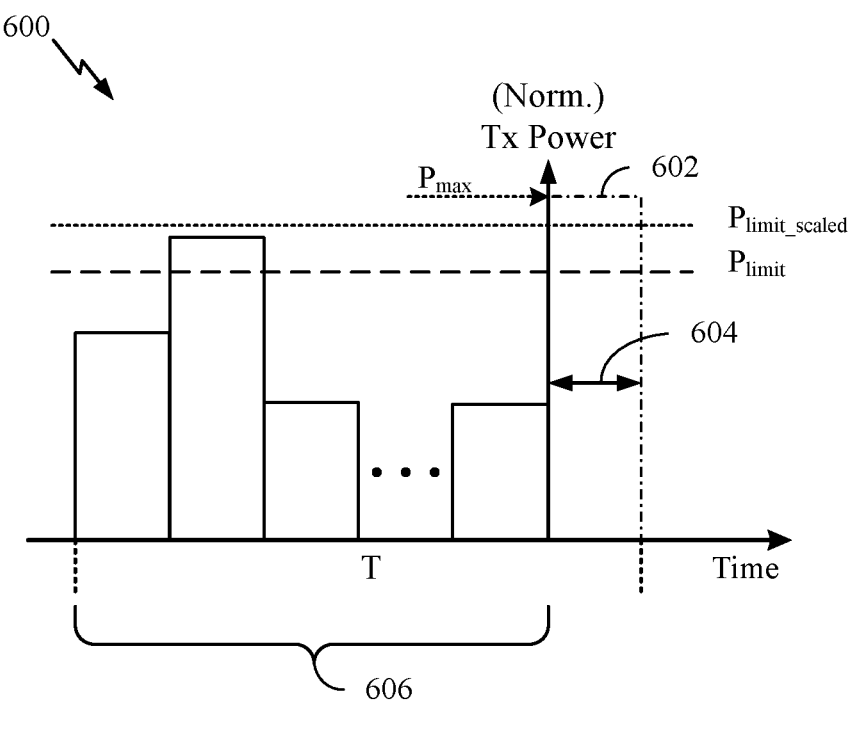
FIG. 6 illustrates a graph of example (normalized) transmit powers over time relative to a maximum time-averaged transmit power level ($P_{limit}$).

FIG. 6 illustrates a graph 600 of example (normalized) transmit powers over time relative to a maximum time-averaged transmit power level ($P_{limit}$), where $P_{limit}$ is scaled using the scaling information. The graph 600 depicts $P_{limit}$ across the time window (T) associated with a time-averaged RF exposure level. In this example, the wireless device may determine a maximum allowed transmit power 602 ($P_{max}$) for a time interval 604 in the time window (T) that satisfies $P_{limit}$. The maximum allowed transmit power 602 ($P_{max}$) may be the maximum transmit power level that the wireless device can use for the time interval 604 in compliance with the time-averaged RF exposure regulatory limit.

The wireless device may determine the maximum allowed transmit power 602 such that the time-averaged transmit power of past transmit powers 606 and the maximum allowed transmit power 602 satisfies a scaled version of the maximum time-averaged transmit power level (e.g., $P_{limit\_scaled}$). In multi-radio transmission scenarios, the wireless device may scale the maximum time-averaged transmit power level ($P_{limit}$) using the scaling information, such as a scaling factor. For example, the wireless device may determine the scaled version of the maximum time-averaged transmit power level as a product of the maximum time-averaged transmit power level and the scaling factor. The wireless device may evaluate the time-averaged RF exposure compliance based on the scaled version of the maximum time-averaged transmit power level ($P_{limit\_scaled}$). The scaled version of the maximum time-averaged transmit power level may allow the wireless device to transmit at higher transmit power in multi-radio transmission scenarios. Performing time-averaging evaluations in terms of transmit power may be difficult if the wireless device transitions between single-radio and multi-radio transmission scenarios as the maximum time-averaged transmit power level changes between $P_{limit}$ and $P_{limit\_scaled}$, respectively. For example, if the wireless device operating at $P_{limit\_scaled}$ in a multi-radio transmission scenario switches to a single-radio transmission scenario, the wireless device cannot guarantee past time-averaged transmit power to be less than $P_{limit}$. For this purpose, in certain aspects, the wireless device may evaluate the time-averaged RF exposure compliance in terms of transmit powers normalized using $P_{limit}$ and/or $P_{limit\_scaled}$, for example, such that the normalized time-averaged transmit power across the time window T is less than or equal to one, irrespective of whether it is single-radio or multi-radio transmission scenario, thus making time-averaging evaluations smooth during transitions between single-radio and multi-radio transmission scenarios. To further elaborate, the normalized time-averaged transmit power level of one in the case of single-radio transmission scenario (corresponding to $P_{limit}$) equals to the maximum time-averaged exposure of RF exposure design target for a representative wireless device, and a worst-case RF exposure for a mass-produced wireless device is RF exposure design target plus the device uncertainty. Similarly, the normalized time-averaged transmit power level of one in the case of multi-radio transmission scenario (corresponding to $P_{limit\_scaled}$) equals to the maximum time-averaged exposure of 'scaling factor*RF exposure design target' for a representative wireless device, and a worst-case RF exposure for a mass-produced wireless device is 'scaling factor*(RF exposure design target plus the device uncertainty)'.

For certain aspects, for a given time-averaged operation based on normalized transmit power history (or normalized exposure relative to RF exposure design target), the scaling factor(s) may be applied to the past transmit power(s) and/or maximum allowed transmit power in multi-radio transmission scenarios. The wireless device may adjust the past transmit power(s) and/or maximum allowed transmit power in the time window associated with the time-averaged RF exposure limit using the scaling factor(s). For example, the past transmit power(s) may be scaled down using a scaling factor, and the maximum allowed transmit power may be scaled up using the scaling factor.

Figure 7:
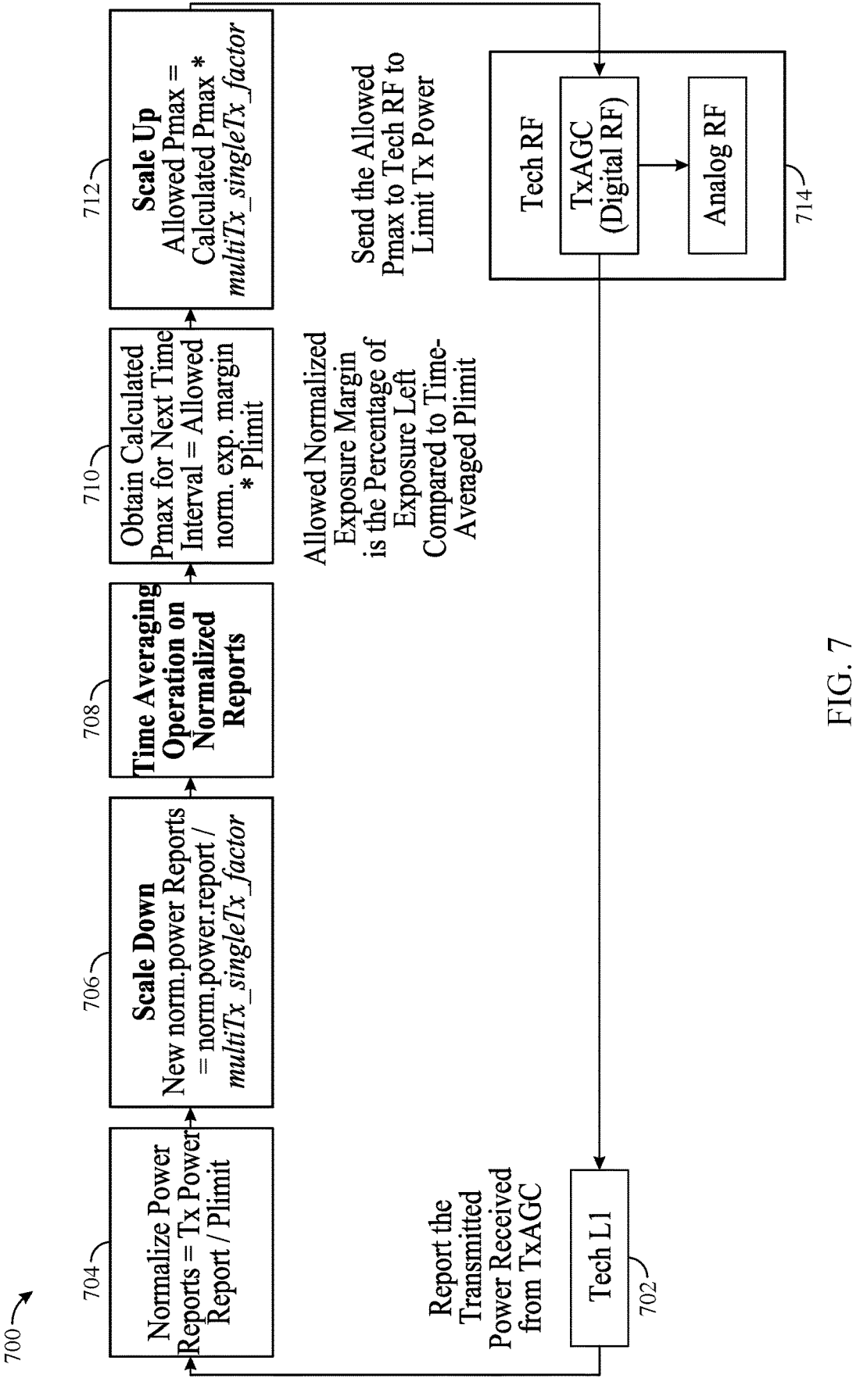
FIG. 7 is a flow diagram illustrating example operations for ensuring compliance with a time-averaged RF exposure limit.

FIG. 7 is a flow diagram illustrating example operations 700 for ensuring compliance with a time-averaged RF exposure regulatory limit. The operations 700 may be performed, for example, by a wireless device (e.g., the UE 120a) and/or a RF transceiver circuit (e.g., the RF transceiver circuit 300). The operations 700 are described with respect to FIG. 8, which illustrates a graph 800 of example (normalized) transmit powers over time relative to a maximum time-averaged transmit power level ($P_{limit}$), where reported transmit powers (e.g., past transmit powers 806 belonging to one regulatory time window) and a maximum allowed transmit power ($P_{max}$) are scaled using the scaling information described herein (referred to as multiTx_singleTx_factor in FIG. 7).

The operations 700 may optionally begin, at block 702, where the wireless device may obtain the transmit power used for a particular time interval (e.g., the second time interval 808) in a time window (T) associated with a time-averaged RF exposure. For example, the transmit power may be obtained from a transmit automatic gain control (TxAGC) module at Layer-1 (L1) of a protocol stack. For example, L1 may include the physical radio layer (PHY). In certain aspects, the controller 336 of the RF transceiver circuit 300 may obtain (or access) the transmit power used for the particular time interval. For example, the controller 336 may include the TxAGC module and track the transmit power output by the transmit path over time. A transmit power report of the past transmit powers (e.g., the past transmit powers 806) may be representative of actual transmit power(s) within an expected device uncertainty.

At block 704, the wireless device may determine a normalized power report of past transmit powers (e.g., the past transmit powers 806). The normalized power report for a particular time interval (e.g., the second time interval 808) may be a past time-averaged transmit power during a time interval (e.g., the second time interval 808) normalized using $P_{limit}$. For example, the normalized power report may be equal to the past time-averaged transmit power(s) during the second time interval 808 divided by $P_{limit}$ (e.g., Normalized Power Report=Tx Power Report/$P_{limit}$), where the transmit power(s) associated with the second time interval 808 are averaged over the second time interval 808. Such normalized power reports may be computed and tracked for multiple time intervals (e.g., corresponding to the past transmit powers 806) belonging to the past regulatory time window (T). The wireless device may determine a sum of the normalized power reports associated with the past transmit powers 806.

At block 706, the wireless device may adjust the normalized power report based on scaling information, such as a scaling factor (referred to as multiTx_singleTx_factor in FIG. 7). The wireless device may scale down the normalized power report by a scaling factor. For example, a scaled version of the normalized power report 810 may be equal to the normalized power report divided by the scaling factor. In single radio transmission scenarios, the wireless device may refrain from using the scaling factor, or the wireless device may apply a scaling factor equal to one.

At block 708, the wireless device may perform a time averaging operation based on the scaled version of the normalized power report. The wireless device may determine a normalized exposure margin allowed for the next time interval (e.g., the first time interval 804) in the time window (T) such that the time average of the scaled version of the normalized power report and the exposure margin for the next time interval satisfy the normalized scaled RF exposure design target. In certain aspects, the exposure margin may be the maximum RF exposure that the wireless device can produce and satisfy the normalized scaled RF exposure design target. The normalized exposure margin may be the percentage of exposure remaining with respect to the normalized power report and the scaled RF exposure design target. For example, the normalized scaled RF exposure design target may be satisfied when the time average of the scaled version of the normalized power report and the exposure margin for the next time interval is less than or equal to one (e.g., the normalized scaled RF exposure design target).

At block 710, the wireless device may determine the maximum allowed transmit power ($P_{max}$) for the next time interval (e.g., the first time interval 804). For example, the maximum allowed transmit power ($P_{max}$) may be equal to the product of the normalized exposure margin and $P_{limit}$.

Figure 8:
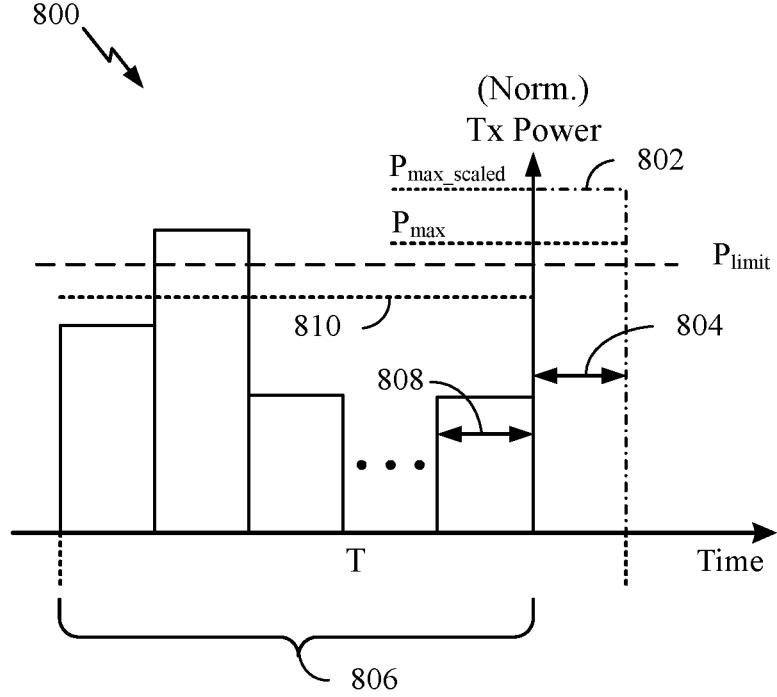
FIG. 8 illustrates a graph of example (normalized) transmit powers over time relative to a maximum time-averaged transmit power level ($P_{limit}$), where reported transmit powers and a maximum allowed transmit power are scaled using scaling information.

At block 712, the wireless device may adjust the maximum allowed transmit power based on the scaling information, such as a scaling factor (referred to as multiTx_singleTx_factor in FIG. 7). The wireless device may scale up the maximum allowed transmit power by the scaling factor. For example, a scaled version of the maximum allowed transmit power ($P_{max\_scaled}$) may be equal to a product of the maximum allowed transmit power and the scaling factor. In single radio transmission scenarios, the wireless device may refrain from using the scaling factor, or the wireless device may apply a scaling factor equal to one. Referring to FIG. 8, the wireless device may use the scaled version of the maximum allowed transmit power 802 as the maximum allowed transmit power for the first time interval 804.

At block 714, the wireless device may provide the scaled version of the maximum allowed transmit power 802 to transceiver circuitry (e.g., the RF transceiver circuit 300). For example, the TxAGC module may obtain the scaled version of the maximum allowed transmit power 802 as digital RF information (e.g., a particular gain index associated with an output power of the transmit path 302), and the TxAGC module may control the gains applied to circuitry (e.g., adjusting the gain at the BBF, mixer, PA, etc.) in the transmit path to output a signal (e.g., an analog RF signal) at the transmit power associated with the digital RF information. The TxAGC module may set the transmit power to a particular level, which may depend on any of various transmit power controls, such as the (scaled) maximum allowed transmit power for RF exposure compliance, RF interference controls (e.g., via base station controls in a closed-loop power control communication), receiver saturation controls, RF emissions controls (e.g., $P_{CMAX}$), thermal controls, etc.

In certain aspects, the wireless device may split the reserve level between multiple radios in a multi-radio transmission scenario (for example, $P_{reserve}/P_{limit}$ in single radio scenario=$P_{reserve1}/P_{limit1}+P_{reserve2}/P_{limit2}+P_{reserve3}/P_{limit3}+ \ldots P_{reserve\_i}/P_{limit\_i}$ in multi-radio transmission scenario) to maintain compliance with time-averaged RF exposure limit. The wireless device may adjust exposure margin(s) and/or reserve(s) for certain radios, for example, in cases where the scaled version of the allowed exposure margin of a radio exceeds a base reserve level (e.g., a base $P_{reserve}$ corresponding to a minimum reserve level that allows a radio to maintain communications with a base station or access point depending current network conditions) and/or where the scaled version of the allowed exposure margin of a radio is below a base reserve level. In some cases, scaling the maximum allowed transmit power may allow uneven application of the scaling factor among multiple radios to satisfy each radio's minimum transmission level (e.g., a base $P_{reserve}$) to maintain radio links for as many radios as possible. In other words, scaling the maximum allowed transmit power may result in the allowed exposure margin of a radio to exceed or not satisfy a base reserve of the respective radio. The time-averaged solution allows radio(s) to transmit above $P_{limit}$ for a given duration and set the transmit power to be below $P_{limit}$ (e.g., $P_{reserve}$) for a duration such that time-averaged power over the time window is less than or equal to $P_{limit}$, for example, as described herein with respect to FIG. 4C. In terms of being normalized by $P_{limit}$, the wireless device may determine a maximum normalized exposure level ($P_{max}/P_{limit}$) for a given duration and determine a normalized reserve level ($P_{reserve}/P_{limit}$) for the remainder of the time window.

In multi-radio transmission scenarios, each radio may operate at a different normalized reserve level (e.g., $P_{reserve1}/P_{limit1}$, $P_{reserve2}/P_{limit2}$, etc.). As the total time-averaged exposure meets the RF exposure limit, in power hungry scenarios (e.g., when the wireless device is transmitting at the edge of a cell), the reserve levels for all radios may not be capable of being satisfied while remaining compliant with time-averaged RF exposure regulatory limit. In such scenarios, the wireless device may ensure each radio obtains at least its corresponding base reserve level and subsequently may apply the scaling factor to the transmit powers for the radios.

As an example, the wireless device may determine the allowed exposure margin level for each radio for a future transmission (e.g., the first time interval 804) while maintaining time-averaged RF exposure compliance. After applying the scaling factor, the wireless device may determine a scaled version of the allowed exposure margin as follows: normalized exposure level of radio(i)=allowed. exposure(i)*scaling_factor. In some cases, certain radios may be allocated an exposure margin that exceeds a base reserve level, and some radios may be allocated an exposure margin below base reserve level to maintain a communication link with a receiving entity (e.g., a base station or access point). If any of the radios are allocated an exposure margin less than a given reserve level, the wireless device may take excess margin from the radios that got more than a base reserve level and re-distribute the excess margin to radio(s) that could use the additional exposure margin (e.g., radios that were allocated a margin less than a base reserve level). The wireless device may scale the re-adjusted exposure margins by the scaling factor (e.g., allowed.exp(i)* scaling_factor).

An example operation for determining the excess margin among active radios and redistributing such excess margin to certain radios is provided below as pseudocode:

```
% STEP 1: first determine the sum of excess margin out of all active radios with respect
to a given base reserve level associated with each of the radios
excess.margin = 0
For i = 1 to number of active radios:
    IF allowed.exp(i) * scaling_factor > base_reserve(i):
        excess.margin = excess.margin +
        { allowed.exp(i) * scaling_factor − base_reserve(i) };
        allowed.exp(i) = base_reserve(i) / scaling_factor;
% STEP 2: next re-distribute the excess margin to satisfy radios that get a margin less
than a given base reserve level
For i = 1 to number of active radios:
    IF allowed.exp(i) * scaling_factor < base_reserve(i)
        temp = excess.margin;
        excess.margin = max{ 0, temp −
        (base_reserve(i) − allowed.exp(i) * scaling_factor ) };
        allowed.exp(i) = min{ base_reserve(i), temp +
        allowed.exp(i)* scaling_factor } / scaling_factor;
% STEP 3: re-adjust the allowed exposure margins by the scaling factor
        allowed.exp(i) = allowed.exp(i)* scaling_factor;
```

Figure 9:
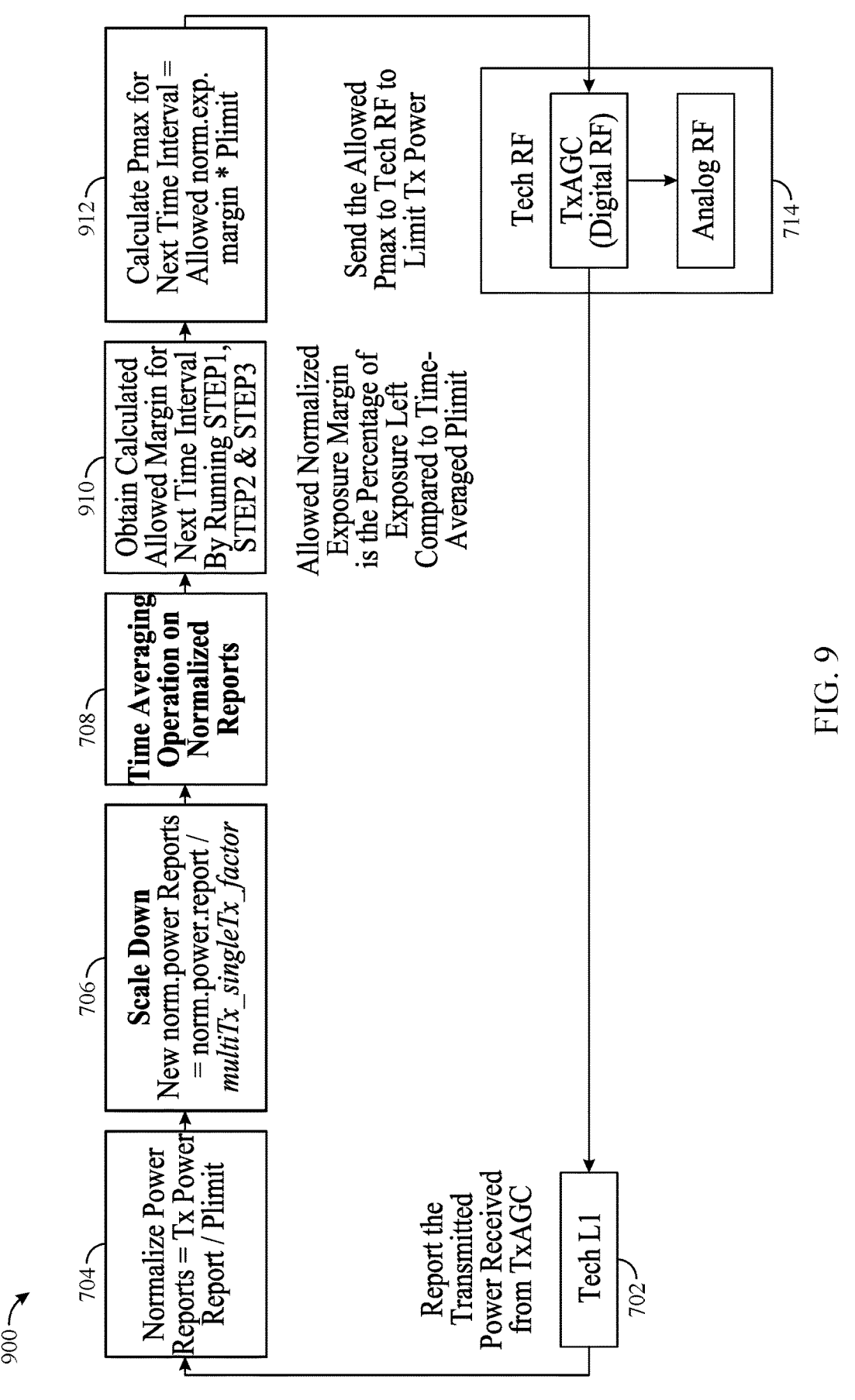
FIG. 9 is a flow diagram illustrating example operations for ensuring compliance with an RF exposure limit where certain margin(s) and/or reserves may be adjusted using scaling information.

FIG. 9 is a flow diagram illustrating example operations 900 for ensuring compliance with an RF exposure limit where certain margin(s) and/or reserve(s) may be adjusted as described herein. The operations 900 may be the same as the operations 700 except for blocks 910 and 912. The operations 900 may be performed, for example, by a wireless device (e.g., the UE 120a) and/or a RF transceiver circuit (e.g., the RF transceiver circuit 300).

At block 910, the wireless device may perform operations to redistribute scaled exposure margin to certain radios. For example, at STEP 1, the wireless device may determine the excess margin among the radios transmitting in the multi-radio transmission scenario, where the excess margin for a given radio is equal to a difference of a scaled version of the allowed exposure margin and a base reserve level associated with the radio (e.g., allowed.exp(i)*scaling_factor−base reserve(i)). At STEP 2, the wireless device may redistribute the excess margin to one or more radios that are allocated exposure margin(s) less than the base reserve level. At STEP 3, the wireless device may scale the re-adjusted exposure margins by the scaling factor.

At block 912, the wireless device may determine the maximum allowed transmit power ($P_{max}$) for each of the scaled exposure margins.

While the examples depicted in FIGS. 6-9 are described herein with respect to determining a scaled transmit power for a particular radio to facilitate understanding, aspects of the present disclosure may be applied to determining a scaled transmit power for each of the radios used in a multi-radio transmission scenario.

FIG. 10 is a flow diagram illustrating example operations 1000 for wireless communication, in accordance with certain aspects of the present disclosure. The operations 1000 may be performed, for example, by a wireless device (e.g., the UE 120a in the wireless communication network 100). The operations 1000 may be implemented as software components that are executed and run on one or more processors (e.g., controller/processor 280 of FIG. 2). Further, the transmission and/or reception of signals by the wireless device in the operations 1000 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 1000 may optionally begin, at block 1002, where the wireless device may obtain scaling information indicative of a relationship between a first RF exposure associated with a plurality of first radios and a second RF exposure associated with a (single) second radio or a single radio transmission scenario. For example, memory may store the scaling information, and the wireless device may obtain (or access) the scaling information from the memory, such as the memory 282 and/or the memory 338. The scaling information may include a ratio of the first RF exposure to the second RF exposure, for example, as described herein with respect to the scaling factor in Expression (1). The first RF exposure may correspond to a first exposure level exhibited (or estimated for) when the plurality of first radios are transmitting simultaneously or in the same time interval associated with a time-averaging time window of a time-averaged RF exposure limit (e.g., a multi-radio transmission scenario), and the second RF exposure may correspond to a second exposure level exhibited (or estimated for) when only the second radio is transmitting (e.g., a single radio transmission scenario).

In certain aspects, the plurality of first radios may include the second radio. For example, the first radios may include an NR band and an IEEE 802.11 channel, and the second radio may include the NR band or the IEEE 802.11 channel. In certain cases, the second RF exposure of the second radio may be representative of the exposure exhibited by (or estimated for) a single radio transmission scenario. For example, the second RF exposure may include an average, median, greatest, or smallest exposure level associated with each of exposure levels for the first radios, where the average, median, greatest, or smallest exposure level may be representative of single radio transmission scenario associated with the first radios. It will be appreciated that the average, median, greatest, or smallest value are merely examples of selecting an exposure level among multiple radios that is representative of the exposure exhibited by (or estimated for) a single radio transmission scenario, and other means for determining the second RF exposure may be used.

At block 1004, the wireless device may determine one or more transmit powers associated with a plurality of radios based at least in part on the scaling information. The wireless device may adjust various parameters associated with time-averaged RF exposure based on the scaling information, for example, as described herein with respect to FIGS. 6-9.

At block 1008, the wireless device may transmit signals using the plurality of radios at one or more transmit powers determined based at least in part on a time-averaged RF exposure limit and the scaling information. The wireless device may transmit multiple signals using the radios in a multi-radio transmission scenario (e.g., in the same transmission occasion). For example, the wireless device may transmit the signals using the radios in a carrier aggregation scenario or dual-connectivity scenario in NR, when the wireless device is simultaneously transmitting via the respective cells or transmitting in the same time interval (e.g., the time interval 604, 804). The wireless device may transmit multiple signals using the radios when the wireless device is simultaneously transmitting signals in NR bands and IEEE 802.11 channels or transmitting such signals in the same time interval (e.g., the time interval 604, 804).

In some cases, to determine the transmit powers, the wireless device may adjust a maximum time-averaged power level ($P_{limit}$) based on the scaling information, for example, as described herein with respect to FIG. 6. The wireless device may adjust a maximum time-averaged power level ($P_{limit}$) corresponding to the time-averaged RF exposure regulatory limit (e.g., after subtracting the device uncertainty) based at least in part on the scaling information. The wireless device may determine the transmit powers based at least in part on the adjusted maximum time-averaged power level. To adjust the maximum time-averaged power level, the wireless device may scale the maximum time-averaged power level by a ratio of the first RF exposure to the second RF exposure in the scaling information. To determine the transmit powers, the wireless device may determine the transmit powers in a time window (T) associated with the RF exposure regulatory limit, such that a time average of the one or more transmit powers and past transmit powers in the time window satisfies the adjusted maximum time-averaged power level. For example, the wireless device may determine a maximum allowed transmit power (e.g., the maximum allowed transmit power 602) such that the time-averaged transmit power of past transmit powers (e.g., the past transmit power 606) and the maximum allowed transmit power satisfies a scaled version of the maximum time-averaged transmit power level (e.g., $P_{limit\_scaled}$).

In certain cases, to determine the transmit powers, the wireless device may adjust a normalized power report and/or a maximum allowed transmit power, for example, as described herein with respect to FIGS. 7 and 8. The wireless device may adjust a normalized power report and a maximum allowed transmit power in a time window associated with the time-averaged RF exposure regulatory limit based on the scaling information. The wireless device may determine the transmit powers based at least in part on the adjusted normalized power report (e.g., the scaled version of the normalized power report) and the adjusted maximum allowed transmit power (e.g., the scaled version of the maximum allowed transmit power). To adjust the normalized power report, the wireless device may scale the normalized power report by a first ratio of the second RF exposure to the first RF exposure in the scaling information. To adjust the maximum allowed transmit power, the wireless device may scale the maximum allowed transmit power by a second ratio of the first RF exposure to the second RF exposure in the scaling information.

In certain aspects, the wireless device may adjust exposure margin(s) and/or reserve(s) for certain radios, for example, as described herein with respect to FIG. 9. The wireless device may determine an allowed exposure margin for each of the plurality of radios based at least in part on the scaling information (e.g., normalized exposure level of radio(i)=allowed.exposure(i)*scaling_factor). The wireless device may determine an excess margin among the plurality of radios with the allowed exposure margin greater than or equal to a first threshold (e.g., a base reserve associated with the respective radio). The wireless device may distribute (e.g., reallocate) the excess margin among the plurality of radios with the allowed exposure margin less than or equal to a second threshold (e.g., a base reserve associated with the respective radio).

For certain aspects, the wireless device may be configured with case-specific scaling factors, and the wireless device may apply a given scaling factor corresponding to a specific case or scenario. The scaling information may include a plurality of factors (e.g., scaling factors), where each of the factors may include a ratio of the first RF exposure to the second RF exposure for a different transmit scenario among a plurality of transmit scenarios.

In some cases, the scaling information may include a first factor and a second factor. The first factor may include a first ratio of the first RF exposure to the second RF exposure corresponding to a first transmit scenario, and the second factor may include a second ratio of the first RF exposure to the second RF exposure corresponding to a second transmit scenario different from the first transmit scenario. For example, the first transmit scenario may use different radios than the second transmit scenario. The wireless device may determine the one or more transmit powers based at least in part on the first factor when the first transmit scenario occurs (e.g., in response to the first transmit scenario occurring or being detected to occur, for example, in a future time interval, such as the time interval 604, 804), and the wireless device may determine the one or more transmit powers based at least in part on the second factor when the second transmit scenario occurs (e.g., in response to the second transmit scenario occurring or being detected to occur, for example, in a future time interval, such as the time interval 604, 804). The first transmit scenario may be different from the second transmit scenario based at least in part on: a RAT (e.g., NR, IEEE 802.11, or Bluetooth), a frequency band (e.g., different NR bands), an antenna (e.g., different antennas), antenna group (e.g., different antenna groups), a radio, an RF exposure scenario (e.g., head exposure, extremity exposure, body exposure, or hotspot exposure), or a combination thereof.

While the examples depicted in FIGS. 1-10 are described herein with respect to a UE performing the various methods for providing RF exposure compliance to facilitate understanding, aspects of the present disclosure may also be applied to other wireless devices, such as a wireless station, an access point, a base station and/or a customer premises equipment (CPE), performing the RF exposure compliance described herein. Further, while the examples are described with respect to communication between the UE (or other wireless device) and a network entity, the UE or other wireless device may be communicating with a device other than a network entity, for example another UE or with another device in a user's home that is not a network entity, for example.

It will be appreciated that the transmit power adjustment described herein may enable desirable wireless communication performance, such as reduced latencies, increased uplink data rates, and/or an improved transmission range (e.g., an improved uplink connection at the edge of a cell).

Example Communications Device

Figure 11:
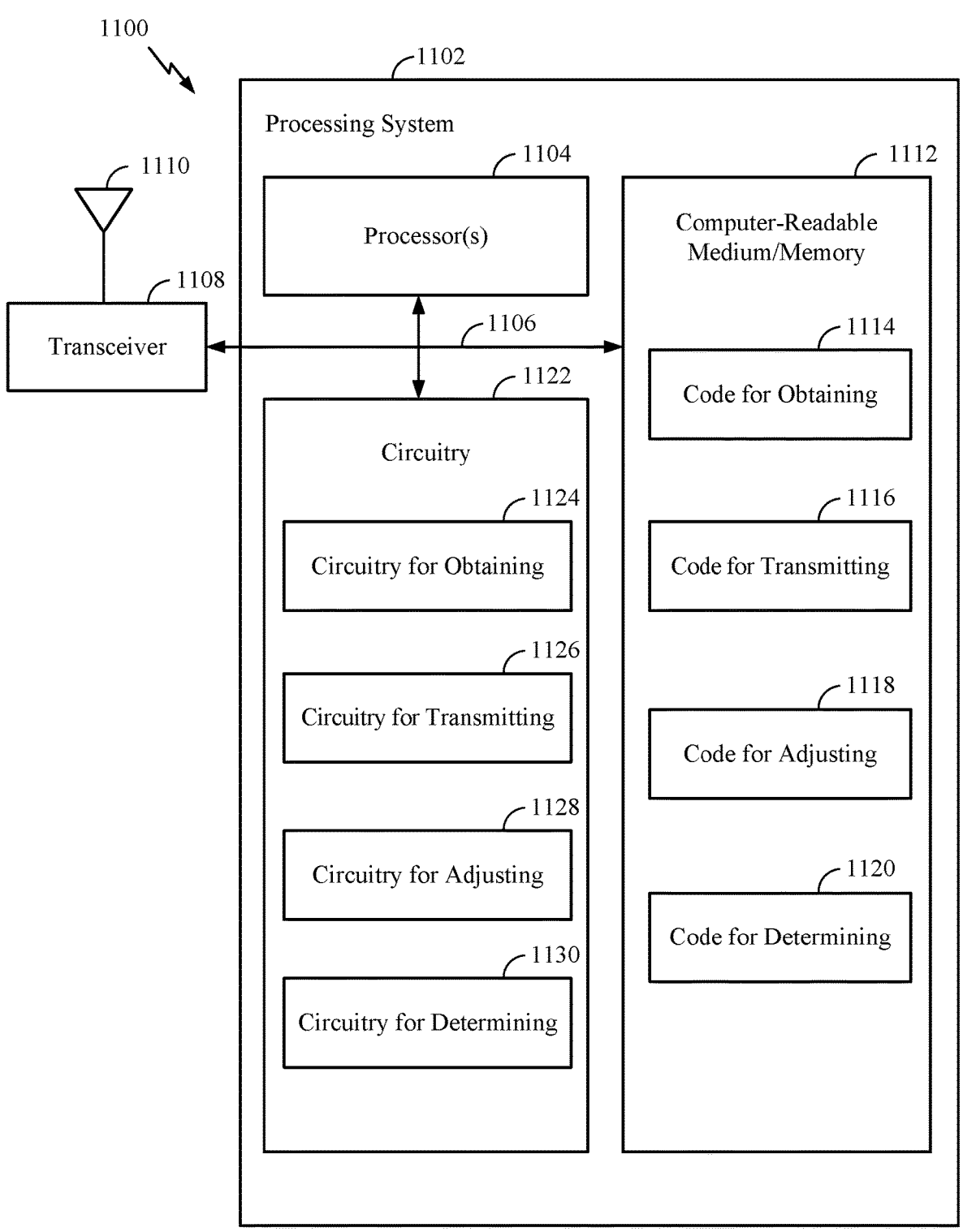
FIG. 11 illustrates a communications device (e.g., a UE) that may include various components configured to perform operations for the techniques disclosed herein, in accordance with certain aspects of the present disclosure.

FIG. 11 illustrates a communications device 1100 (e.g., the UE 120) that may include various components (e.g., corresponding to means-plus-function components) configured to perform operations for the techniques disclosed herein, such as the operations illustrated in FIG. 10. The communications device 1100 includes a processing system 1102, which may be coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 (e.g., one or more processors) coupled to a computer-readable medium/memory 1112 via a bus 1106. In certain aspects, the computer-readable medium/memory 1112 is configured to store instructions (e.g., computer-executable code) that when executed by the processor 1104, cause the communications device 1100 to perform the operations 1000 illustrated in FIG. 10, or other operations for performing the various techniques discussed herein for providing RF exposure compliance with scaled transmit powers. In certain aspects, computer-readable medium/memory 1112 stores code for obtaining 1114, code for transmitting (or outputting) 1116, code for adjusting (or scaling) 1118, code for determining 1120, or any combination thereof.

In certain aspects, the processing system 1102 has circuitry 1122 configured to implement the code stored in the computer-readable medium/memory 1112. In certain aspects, the circuitry 1122 is coupled to the processor 1104 and/or the computer-readable medium/memory 1112 via the bus 1106.

For example, the circuitry 1122 includes circuitry for obtaining 1124, circuitry for transmitting (or outputting) 1126, circuitry for adjusting (or scaling) 1128, circuitry for determining 1130, or any combination thereof.

In some examples, means for transmitting (or means for outputting for transmission) may include the transceivers 254 and/or antenna(s) 252 of the UE 120 illustrated in FIG. 2 and/or transceiver 1108 and antenna 1110 of the communications device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for obtaining, means for adjusting, and/or means for determining may include various processing system components, such as: the processor 1104 in FIG. 11, or aspects of the UE 120 depicted in FIG. 2, including receive processor 258, transmit processor 264, TX MIMO processor 266, and/or controller/processor 280.

Example Aspects

Implementation examples are described in the following numbered clauses:

Aspect 1: A method of wireless communication by a wireless device, comprising: obtaining scaling information indicative of a relationship between a first radio frequency (RF) exposure associated with a plurality of first radios and a second RF exposure associated with a second radio; and transmitting signals using a plurality of radios at one or more transmit powers determined based at least in part on a time-averaged RF exposure limit and the scaling information.

Aspect 2: The method of Aspect 1, wherein the scaling information includes a ratio of the first RF exposure to the second RF exposure.

Aspect 3: The method of Aspect 1 or 2, wherein: the first RF exposure corresponds to a first exposure level exhibited when the plurality of first radios are transmitting simultaneously; and the second RF exposure corresponds to a second exposure level exhibited when only the second radio is transmitting.

Aspect 4: The method according to any of Aspects 1-3, further comprising: adjusting a maximum time-averaged power level corresponding to the time-averaged RF exposure limit based at least in part on the scaling information; and determining the one or more transmit powers based at least in part on the adjusted maximum time-averaged power level.

Aspect 5: The method of Aspect 4, wherein adjusting the maximum time-averaged power level comprises scaling the maximum time-averaged power level by a ratio of the first RF exposure to the second RF exposure in the scaling information.

Aspect 6: The method of Aspect 4 or 5, wherein determining the one or more transmit powers comprises determining the one or more transmit powers in a time window associated with the time-averaged RF exposure limit, such that a time average of the one or more transmit powers and past transmit powers in the time window satisfies the adjusted maximum time-averaged power level.

Aspect 7: The method according to any of Aspects 1-6, further comprising: adjusting a normalized power report and a maximum allowed transmit power in a time window associated with the time-averaged RF exposure limit based on the scaling information; and determining the one or more transmit powers based at least in part on the adjusted normalized power report and the adjusted maximum allowed transmit power.

Aspect 8: The method of Aspect 7, wherein adjusting the normalized power report and the maximum allowed transmit power comprises: scaling the normalized power report by a first ratio of the second RF exposure to the first RF exposure in the scaling information; and scaling the maximum allowed transmit power by a second ratio of the first RF exposure to the second RF exposure in the scaling information.

Aspect 9: The method according to any of Aspects 1-9, further comprising: determining an allowed exposure margin for each of the plurality of radios based at least in part on the scaling information; determining an excess margin among the plurality of radios with the allowed exposure margin greater than or equal to a first threshold; and distributing the excess margin among the plurality of radios with the allowed exposure margin less than or equal to a second threshold.

Aspect 10: The method according to any of Aspects 1-9, wherein: the scaling information includes a plurality of factors; and each of the factors includes a ratio of the first RF exposure to the second RF exposure for a different transmit scenario among a plurality of transmit scenarios.

Aspect 11: The method according to any of Aspects 1-10, wherein: the scaling information includes a first factor and a second factor; the first factor includes a first ratio of the first RF exposure to the second RF exposure corresponding to a first transmit scenario; and the second factor includes a second ratio of the first RF exposure to the second RF exposure corresponding to a second transmit scenario different from the first transmit scenario.

Aspect 12: The method of Aspect 11, further comprising: determining the one or more transmit powers based at least in part on the first factor when the first transmit scenario occurs; and determining the one or more transmit powers based at least in part on the second factor when the second transmit scenario occurs.

Aspect 13: The method of Aspect 11 or 12, wherein the first transmit scenario is different from the second transmit scenario based at least in part on: a radio access technology, a frequency band, an antenna, a radio, a RF exposure scenario, or a combination thereof.

Aspect 14: An apparatus for wireless communication, comprising: a memory; and one or more processors coupled to the memory, the one or more processors being configured to: obtain scaling information indicative of a relationship between a first radio frequency (RF) exposure associated with a plurality of first radios and a second RF exposure associated with a second radio, and control transmission of signals using a plurality of radios at one or more transmit powers determined based at least in part on a time-averaged RF exposure limit and the scaling information.

Aspect 15: The apparatus of Aspect 14, further comprising a transmitter coupled to the one or more processors and configured to transmit the signals using the plurality of radios at the one or more transmit powers, wherein the scaling information includes a ratio of the first RF exposure to the second RF exposure.

Aspect 16: The apparatus of Aspect 14 or 15, wherein: the first RF exposure corresponds to a first exposure level exhibited when the plurality of first radios are transmitting simultaneously or in a same time interval; and the second RF exposure corresponds to a second exposure level exhibited when only the second radio is transmitting.

Aspect 17: The apparatus according to any of Aspects 14-16, wherein the one or more processors are further configured to: adjust a maximum time-averaged power level corresponding to the time-averaged RF exposure limit based at least in part on the scaling information, and determine the one or more transmit powers based at least in part on the adjusted maximum time-averaged power level.

Aspect 18: The apparatus of Aspect 17, wherein to adjust the maximum time-averaged power level, the one or more processors are further configured to scale the maximum time-averaged power level by a ratio of the first RF exposure to the second RF exposure in the scaling information.

Aspect 19: The apparatus of Aspect 17 or 18, wherein to determine the one or more transmit powers, the one or more processors are further configured to determine the one or more transmit powers in a time window associated with the time-averaged RF exposure limit, such that a time average of the one or more transmit powers and past transmit powers in the time window satisfies the adjusted maximum time-averaged power level.

Aspect 20: The apparatus according to any of Aspects 14-19, wherein the one or more processors are further configured to: adjust a normalized power report and a maximum allowed transmit power in a time window associated with the time-averaged RF exposure limit based on the scaling information, and determine the one or more transmit powers based at least in part on the adjusted normalized power report and the adjusted maximum allowed transmit power.

Aspect 21: The apparatus of Aspect 20, wherein to adjust the normalized power report and the maximum allowed transmit power, the one or more processors are further configured to: scale the normalized power report by a first ratio of the second RF exposure to the first RF exposure in the scaling information, and scale the maximum allowed transmit power by a second ratio of the first RF exposure to the second RF exposure in the scaling information.

Aspect 22: The apparatus according to any of Aspects 14-21, wherein the one or more processors are further configured to: determine an allowed exposure margin for each of the plurality of radios based at least in part on the scaling information, determine an excess margin among the plurality of radios with the allowed exposure margin greater than or equal to a first threshold, and distribute the excess margin among the plurality of radios with the allowed exposure margin less than or equal to a second threshold.

Aspect 23: The apparatus according to any of Aspects 14-22, wherein: the scaling information includes a plurality of factors; and each of the factors includes a ratio of the first RF exposure to the second RF exposure for a different transmit scenario among a plurality of transmit scenarios.

Aspect 24: The apparatus according to any of Aspects 14-23, wherein: the scaling information includes a first factor and a second factor; the first factor includes a first ratio of the first RF exposure to the second RF exposure corresponding to a first transmit scenario; and the second factor includes a second ratio of the first RF exposure to the second RF exposure corresponding to a second transmit scenario different from the first transmit scenario.

Aspect 25: The apparatus of Aspect 24, wherein the one or more processors are further configured to: determine the one or more transmit powers based at least in part on the first factor when the first transmit scenario occurs, and determine the one or more transmit powers based at least in part on the second factor when the second transmit scenario occurs.

Aspect 26: The apparatus of Aspect 24 or 25, wherein the first transmit scenario is different from the second transmit scenario based at least in part on: a radio access technology, a frequency band, an antenna, a radio, a RF exposure scenario, or a combination thereof.

Aspect 27: A non-transitory computer-readable medium having instructions stored thereon for: obtaining scaling information indicative of a relationship between a first radio frequency (RF) exposure associated with a plurality of first radios and a second RF exposure associated with a second radio; and transmitting signals using a plurality of radios at one or more transmit powers determined based at least in part on a time-averaged RF exposure limit and the scaling information.

Aspect 28: An apparatus comprising: a memory comprising computer-executable instructions; and one or more processors configured to execute the computer-executable instructions and cause the processing system to perform a method in accordance with any of Aspects 1-13.

Aspect 29: An apparatus comprising means for performing a method in accordance with any of Aspects 1-13.

Aspect 30: A non-transitory computer-readable medium comprising computer-executable instructions that, when executed by one or more processors of a processing system, cause the processing system to perform a method in accordance with any of Aspects 1-13.

Aspect 31: A computer program product embodied on a computer-readable storage medium comprising code for performing a method in accordance with any of Aspects 1-13.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wristband, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s), and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
    obtaining scaling information indicative of a relationship between a first radio frequency (RF) exposure associated with a plurality of first radios and a second RF exposure associated with a second radio;
    transmitting signals using a plurality of radios at one or more transmit powers determined based at least in part on a time-averaged RF exposure limit and the scaling information;
    determining an allowed exposure margin for each of the plurality of radios based at least in part on the scaling information;
    determining an excess margin among the plurality of radios with the allowed exposure margin greater than or equal to a first threshold; and
    distributing the excess margin among the plurality of radios with the allowed exposure margin less than or equal to a second threshold.

2. The method of claim 1, wherein the scaling information includes a ratio of the first RF exposure to the second RF exposure.

3. The method of claim 1, wherein:
    the first RF exposure corresponds to a first exposure level exhibited when the plurality of first radios are transmitting simultaneously or in a same time interval; and the second RF exposure corresponds to a second exposure level exhibited when only the second radio is transmitting.

4. The method of claim 1, further comprising:
    adjusting a maximum time-averaged power level corresponding to the time-averaged RF exposure limit based at least in part on the scaling information; and
    determining the one or more transmit powers based at least in part on the adjusted maximum time-averaged power level.

5. The method of claim 4, wherein adjusting the maximum time-averaged power level comprises scaling the maximum time-averaged power level by a ratio of the first RF exposure to the second RF exposure in the scaling information.

6. The method of claim 4, wherein determining the one or more transmit powers comprises determining the one or more transmit powers in a time window associated with the time-averaged RF exposure limit, such that a time average of the one or more transmit powers and past transmit powers in the time window satisfies the adjusted maximum time-averaged power level.

7. The method of claim 1, further comprising:
    adjusting a normalized power report and a maximum allowed transmit power in a time window associated with the time-averaged RF exposure limit based on the scaling information; and
    determining the one or more transmit powers based at least in part on the adjusted normalized power report and the adjusted maximum allowed transmit power.

8. The method of claim 7, wherein adjusting the normalized power report and the maximum allowed transmit power comprises:
    scaling the normalized power report by a first ratio of the second RF exposure to the first RF exposure in the scaling information; and
    scaling the maximum allowed transmit power by a second ratio of the first RF exposure to the second RF exposure in the scaling information.

9. The method of claim 1, wherein:
    the scaling information includes a plurality of factors; and
    each of the factors includes a ratio of the first RF exposure to the second RF exposure for a different transmit scenario among a plurality of transmit scenarios.

10. The method of claim 1, wherein:
    the scaling information includes a first factor and a second factor;
    the first factor includes a first ratio of the first RF exposure to the second RF exposure corresponding to a first transmit scenario; and
    the second factor includes a second ratio of the first RF exposure to the second RF exposure corresponding to a second transmit scenario different from the first transmit scenario.

11. The method of claim 10, further comprising:
    determining the one or more transmit powers based at least in part on the first factor when the first transmit scenario occurs; and
    determining the one or more transmit powers based at least in part on the second factor when the second transmit scenario occurs.

12. The method of claim 10, wherein the first transmit scenario is different from the second transmit scenario based at least in part on:
    a radio access technology,
    a frequency band,
    an antenna, a radio, a RF exposure scenario, or a combination thereof.

13. An apparatus for wireless communication, comprising:

a memory; and one or more processors coupled to the memory, the one or more processors being configured to:

obtain scaling information indicative of a relationship between a first radio frequency (RF) exposure associated with a plurality of first radios and a second RF exposure associated with a second radio, control transmission of signals using a plurality of radios at one or more transmit powers determined based at least in part on a time-averaged RF exposure limit and the scaling information, adjust a maximum time-averaged power level corresponding to the time-averaged RF exposure limit based at least in part on the scaling information, and determine the one or more transmit powers based at least in part on the adjusted maximum time-averaged power level.

14. The apparatus of claim 13, further comprising a transmitter coupled to the one or more processors and configured to transmit the signals using the plurality of radios at the one or more transmit powers, wherein the scaling information includes a ratio of the first RF exposure to the second RF exposure.

15. The apparatus of claim 13, wherein:

the first RF exposure corresponds to a first exposure level exhibited when the plurality of first radios are transmitting simultaneously or in a same time interval; and the second RF exposure corresponds to a second exposure level exhibited when only the second radio is transmitting.

16. The apparatus of claim 13, wherein to adjust the maximum time-averaged power level, the one or more processors are further configured to scale the maximum time-averaged power level by a ratio of the first RF exposure to the second RF exposure in the scaling information.

17. The apparatus of claim 13, wherein to determine the one or more transmit powers, the one or more processors are further configured to determine the one or more transmit powers in a time window associated with the time-averaged RF exposure limit, such that a time average of the one or more transmit powers and past transmit powers in the time window satisfies the adjusted maximum time-averaged power level.

18. The apparatus of claim 13, wherein:

the scaling information includes a plurality of factors; and each of the factors includes a ratio of the first RF exposure to the second RF exposure for a different transmit scenario among a plurality of transmit scenarios.

19. The apparatus of claim 13, wherein:

the scaling information includes a first factor and a second factor;

the first factor includes a first ratio of the first RF exposure to the second RF exposure corresponding to a first transmit scenario; and the second factor includes a second ratio of the first RF exposure to the second RF exposure corresponding to a second transmit scenario different from the first transmit scenario.

20. The apparatus of claim 19, wherein the one or more processors are further configured to:

determine the one or more transmit powers based at least in part on the first factor when the first transmit scenario occurs, and determine the one or more transmit powers based at least in part on the second factor when the second transmit scenario occurs.

21. The apparatus of claim 19, wherein the first transmit scenario is different from the second transmit scenario based at least in part on:

a radio access technology, a frequency band, an antenna, a radio, a RF exposure scenario, or a combination thereof.

22. An apparatus for wireless communication, comprising:

a memory; and one or more processors coupled to the memory, the one or more processors being configured to:

obtain scaling information indicative of a relationship between a first radio frequency (RF) exposure associated with a plurality of first radios and a second RF exposure associated with a second radio, control transmission of signals using a plurality of radios at one or more transmit powers determined based at least in part on a time-averaged RF exposure limit and the scaling information, adjust a normalized power report and a maximum allowed transmit power in a time window associated with the time-averaged RF exposure limit based on the scaling information, and determine the one or more transmit powers based at least in part on the adjusted normalized power report and the adjusted maximum allowed transmit power.

23. The apparatus of claim 22, wherein to adjust the normalized power report and the maximum allowed transmit power, the one or more processors are further configured to:

scale the normalized power report by a first ratio of the second RF exposure to the first RF exposure in the scaling information, and scale the maximum allowed transmit power by a second ratio of the first RF exposure to the second RF exposure in the scaling information.

24. An apparatus for wireless communication, comprising:

a memory; and one or more processors coupled to the memory, the one or more processors being configured to:

obtain scaling information indicative of a relationship between a first radio frequency (RF) exposure associated with a plurality of first radios and a second RF exposure associated with a second radio, control transmission of signals using a plurality of radios at one or more transmit powers determined based at least in part on a time-averaged RF exposure limit and the scaling information, determine an allowed exposure margin for each of the plurality of radios based at least in part on the scaling information, determine an excess margin among the plurality of radios with the allowed exposure margin greater than or equal to a first threshold, and distribute the excess margin among the plurality of radios with the allowed exposure margin less than or equal to a second threshold.

25. A non-transitory computer-readable medium having instructions stored thereon for:

obtaining scaling information indicative of a relationship between a first radio frequency (RF) exposure associated with a plurality of first radios and a second RF exposure associated with a second radio;

transmitting signals using a plurality of radios at one or more transmit powers determined based at least in part on a time-averaged RF exposure limit and the scaling information;

adjusting a normalized power report and a maximum allowed transmit power in a time window associated with the time-averaged RF exposure limit based on the scaling information; and determining the one or more transmit powers based at least in part on the adjusted normalized power report and the adjusted maximum allowed transmit power.

\* \* \* \* \*